US009990063B1

(12) United States Patent
Beguin et al.

(10) Patent No.: US 9,990,063 B1
(45) Date of Patent: Jun. 5, 2018

(54) TECHNIQUES FOR OPERATING ELECTRONIC PAPER DISPLAYS

(75) Inventors: Julien G. Beguin, San Francisco, CA (US); Bradley J. Bozarth, Sunnyvale, CA (US); Ilya D. Rosenberg, Mountain View, CA (US); Jay Michael Puckett, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1268 days.

(21) Appl. No.: 13/247,641

(22) Filed: Sep. 28, 2011

(51) Int. Cl.
| G06F 3/041 | (2006.01) |
| G06F 3/042 | (2006.01) |
| G06F 3/02 | (2006.01) |
| G02B 26/00 | (2006.01) |
| G09G 3/00 | (2006.01) |

(52) U.S. Cl.
CPC ............... *G06F 3/041* (2013.01); *G06F 3/02* (2013.01); *G06F 3/042* (2013.01); *G02B 26/005* (2013.01); *G09G 3/001* (2013.01)

(58) Field of Classification Search
None
See application file for complete search history.

(56) References Cited

U.S. PATENT DOCUMENTS

| 2005/0024353 | A1* | 2/2005 | Amundson et al. | 345/204 |
| 2005/0280626 | A1* | 12/2005 | Amundson et al. | 345/107 |
| 2007/0200874 | A1* | 8/2007 | Amundson et al. | 345/690 |
| 2007/0205978 | A1* | 9/2007 | Zhou | G06F 3/0488 345/107 |
| 2009/0256868 | A1* | 10/2009 | Low et al. | 345/691 |
| 2010/0149161 | A1* | 6/2010 | Hiramatsu | G09G 3/344 345/211 |
| 2012/0229485 | A1* | 9/2012 | Rhodes et al. | 345/545 |

OTHER PUBLICATIONS

"GIMP User Manual." 5.6. Threshold. May 1, 2009. Web. Jun. 14, 2016. <http://docs.gimp.org/en/gimp-tool-threshold.html>. Internet Archive. <https://web.archive.org/web/20090501155333/http://docs.gimp.org/en/gimp-tool-threshold.html>.*

(Continued)

*Primary Examiner* — Barry Drennan
*Assistant Examiner* — Schiller Hill
(74) *Attorney, Agent, or Firm* — Lee & Hayes, PLLC

(57) ABSTRACT

Techniques for operating electronic paper displays of respective electronic devices are described. One set of techniques described below enhances user experience by utilizing multiple different waveform and/or display-update modes when rendering content on these displays. Another set of techniques are able to render lines on electronic paper displays having variable and arbitrary darkness, despite the restricted color depth inherent in these displays. In addition, this disclosure describes techniques for utilizing supersampling to select which shades to render on an electronic paper display of an electronic device. In still other implementations, the techniques described herein allocate a predefined frame rate of an electronic paper display between multiple different application components requesting to update the display, resulting smooth animation and relatively high-frame updates.

27 Claims, 13 Drawing Sheets

(56) References Cited

OTHER PUBLICATIONS

Ashbrook, et al., "Nenya: Subtle and Eyes-Free Mobile Input with a Magnetically—Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Comlumbia, Canada, Oct. 4-7, 2009), UIST '09. ACM, New York, NY, 4 pages.

* cited by examiner

TECHNIQUES FOR OPERATING ELECTRONIC PAPER DISPLAYS

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
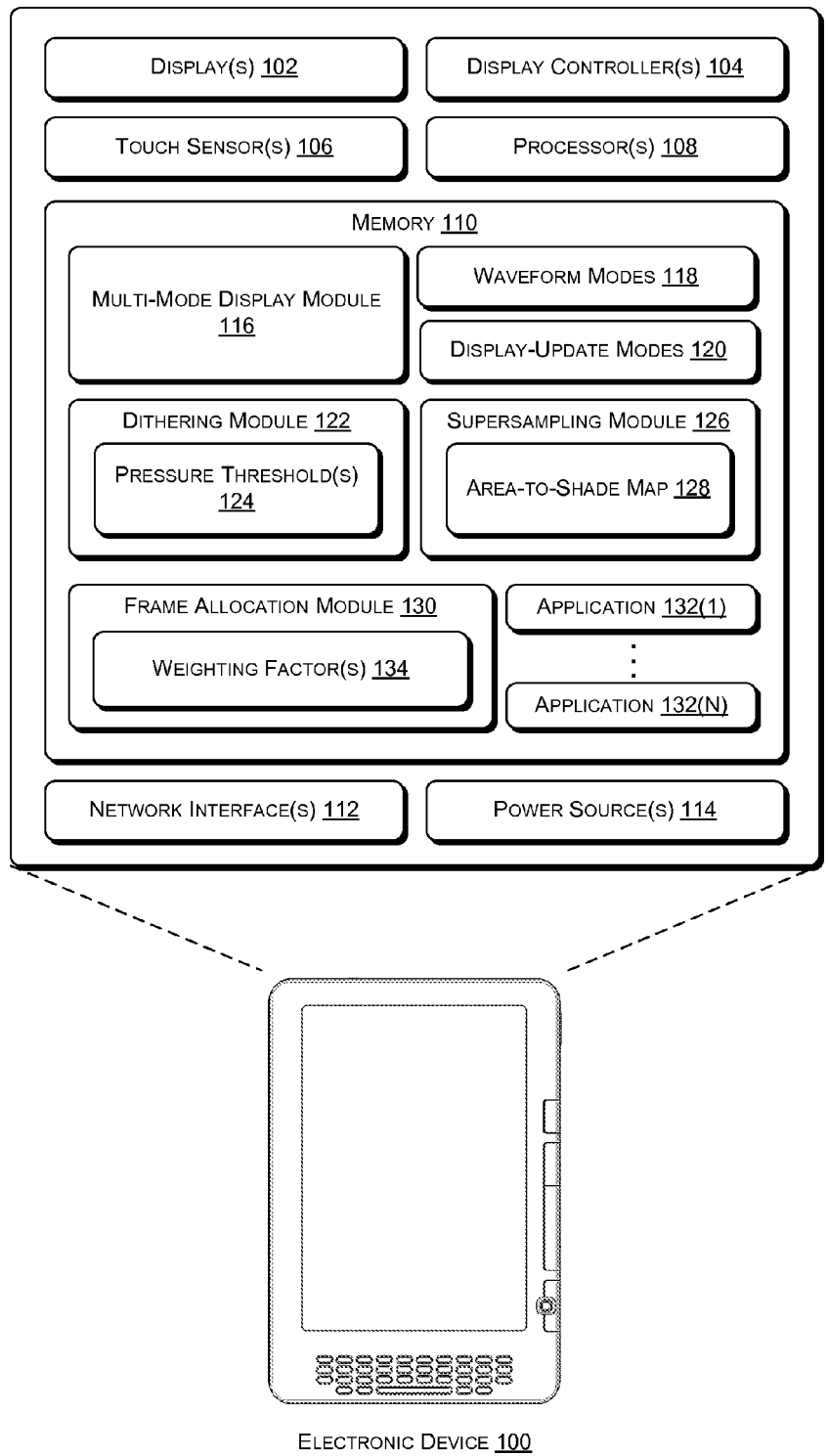
FIG. 1 illustrates an example electronic device configured with functionality for enhancing operability of a display of the device.

This disclosure describes, in part, techniques for operating electronic paper displays of respective electronic devices. One set of techniques described below enhances user experience by utilizing multiple different waveform and/or display-update modes when rendering content on these displays. For example, in response to a user of an electronic device requesting to render an image on an electronic paper display of the device, the techniques described herein may quickly render an image on the display using a first mode. For instance, the first mode may be configured to render black and white pixels and, therefore, the techniques may quickly render a black and white version of the requested image.

Thereafter, while rendering this first version of the image, the techniques may render a second version of the image using a second mode. This second mode may support a larger number of shades and/or colors than the first mode and, therefore, may take additional time to render the second version of the image as compared to the rendering of the first version. In some instances, the second mode supports the rendering of gray pixels in addition to the black and white pixels renderable in the first mode.

By combining waveform and/or display-update modes in this manner, the techniques allow for electronic paper displays to quickly draw a faster, lower-quality version of the image (for the purpose of providing a user with immediate feedback) before drawing a higher-quality version of the image. Further, because the second mode does not clear the pixels drawn by the first mode, the user's consumption of the image is not interrupted during the transition from the first version of the image to the second version of the image. In some instances, the techniques allow for the stacking of any number of waveforms and/or display-update modes for the purpose of providing both timely and high-quality renderings on electronic paper displays.

In other instances described below, the techniques are able to render lines on electronic paper displays having variable and arbitrary darkness, despite the restricted color depth inherent in these displays. To do so, the techniques may select which of multiple modes to utilize when a user draws a line on an electronic paper display, with this selection being based at least in part on an amount of force or pressure that the user draws with. For instance, when a user draws a line on a touch-sensitive, electronic paper display (e.g., with a stylus, a finger, etc.), a touch sensor residing behind the display may measure an amount of pressure that the user draws with. The techniques may then select which waveform or display-update mode to utilize when rendering the line in accordance with the touch of the user.

In some instances, selecting modes based on the amount of pressure corresponding to a user's touch allows for real-time dithering of the shades available by the corresponding modes. This dithering of the different available shades may in some instances simulate the look of a pencil on paper, where graphite and paper fibers contribute to form a non-uniform line texture. In addition, dithering in this manner allows for rendering lines having a darkness corresponding to the pressure that a user provides. As such, the techniques may render a relatively lighter line in response to a user drawing with a relatively light touch, and may render a relatively darker line in response to the user drawing with a relatively heavier touch.

To illustrate, when a user draws on a touch-sensitive display with an amount of pressure that is less than a first threshold, the techniques may utilize a first mode to render the line on the display. This first mode may utilize an array of black, gray, and white pixels, and the techniques may select a mixture of these pixels to render a line having a darkness corresponding to the relatively lighter touch of the user. However, when the user provides an additional amount of pressure on the touch-sensitive display that exceeds the first threshold, the techniques may utilize a second, different mode to render the next portion of the line. This mode may support fewer shades than the first mode in some instances. For instance, the second mode may support black and white pixels, while not supporting the rendering of gray pixels. As such, the techniques may render a relatively darker line using the black and white pixels, in accordance with the relatively heavier touch of the user.

In addition, the disclosure below describes techniques for utilizing supersampling to select which shades to render on an electronic paper display of an electronic device. For instance, when a user draws with a writing instrument (e.g., with a stylus, a finger, etc.) on an electronic paper display, the techniques may determine how much surface area of one or more pixels the writing instrument actually contacted and may select a shade based on the amount of contacted surface area.

To make this determination, the techniques may model the one or more pixels as an N×N grid (e.g., 2×2, 4×4, etc.) and may determine how many of the resulting $N^2$ regions have been contacted by the writing instrument. The techniques may reference an area-to-shade map to that maps a number of contacted regions to corresponding shades. For instance, in response to determining that the writing instrument contacted relatively few regions, the techniques may select a relatively light shade of gray. Conversely, in response to determining that the writing instrument contacted a large number of regions, the techniques may select a relatively dark shade. After selecting the shade in this manner, the techniques may render the pixel in the selected shade.

In addition, this disclosure describes techniques for intentionally utilizing ghosting on electronic paper displays. Ghosting refers to the phenomenon when an erased image still appears in a very small but perceivable manner on the display. Ghosted images often appear when corresponding images have been erased from physical paper on which these images were drawn. By providing for ghosting on electronic paper displays, the techniques translate this phenomenon previously limited to the analog realm to the digital realm.

To leave a ghosted version of an image, these techniques may avoid erasing or updating images with a flashing "clear", which has the effect of completely erasing black and gray pixels from an electronic paper display. Instead, the techniques may utilize a non-flashing clear that results in a lighter shade of gray rather than a perfect white. As such, when a user of an electronic device draws and erases images, these previous images may remain slightly perceivable in subsequent images, similar to the artistic experience of continually drawing and erasing images on paper.

In still other implementations, the techniques described below achieve smooth animation and relatively high-frame updates for displays having relatively slow overall frame rates, such as electronic paper displays. For instance, when multiple application components desire to draw different lines in different regions of an electronic paper display, the techniques may allocate the overall frame rate of the electronic paper display to the individual requests. A display controller of the display may then cycle through updating the different regions of the display, such that each region is updated smoothly, albeit at a lesser frame rate than would be achievable if no other areas of the display were requesting updates at the same time. Because electronic paper displays may update smaller areas much more quickly than larger areas, allocating a frame rate to individual requests and then sequentially updating relatively small portions of the display associated with those requests results in a faster overall update than if the display were updated in its entirety.

To illustrate, envision that a first application component requests to draw a line on a top-right region of an electronic paper display, while a second application component requests to draw a line on a bottom-left region of the display. In addition, envision that the display controller is updating the display at a frame rate of thirty frames per second. In response to this scenario, the techniques may allocate the frame rate between the two (and potentially additional) application components that are requesting to draw lines on the display. This allocation may be equal amongst the components or may be weighted based on one or more factors, such as a priority of the updates, user preferences, and the like.

In this example, envision that the techniques allocate the frame rate equally, such that both the first and second application components are able to update the display at fifteen frames per second. As such, the display controller may cycle between updating the top-right region of the display and updating the bottom-left region of the display. Because for any given frame the display controller is only updating this relatively small portion of the display, the techniques are able to achieve smooth animation of both of these drawings. In addition, the regions may be updated much more quickly than if the entire display region were updated in its entirety.

Example Electronic Device

FIG. 1 illustrates an example electronic device 100 configured to implement the techniques described above. While FIG. 1 illustrates the device 100 as a dedicated electronic book reading device, in other implementations the device 100 may comprise any other type of mobile electronic device (e.g., a laptop computer, a tablet computing device, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, this device 100 includes one or more displays 102 and corresponding display controllers 104. The one or more displays 102 may represent liquid crystal displays (LCDs), plasma displays, Light Emitting Diode (LED) displays, electronic paper displays, and/or the like. In some instances, the electronic device 100 utilizes at least one electronic paper display for rendering content on the device 100.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the electronic paper display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In addition to including the one or more displays 102, FIG. 1 illustrates that the device 100 includes one or more touch sensors 106. In some instances, at least one touch sensor 106 resides underneath or on top of a corresponding display 102 to form a touch-sensitive display that is capable of both accepting user input and rendering content corresponding to the input. In other instances, the device 100 may include a touch sensor that is adjacent to a display. It is to be appreciated that each of the techniques described below may apply to instances where the touch sensor 106 and the display 102 form a touch-sensitive display and instances where the sensor 106 and the display 102 do not.

The touch sensor 106 may comprise a capacitive touch sensor, an interpolating force sensitive resistance (IFSR) sensor, or any other type of touch sensor. In some instances, the touch sensor 106 is capable of detecting touches as well as determining an amount of pressure or force of these touches. For instance, the touch sensor 106 may comprise an ISFR sensor resident behind an electronic paper display, such that a user is able to draw upon the display utilizing a writing instrument, such as a stylus, a finger of the user, or the like. As described in detail below, by measuring forces of a user's touch on the touch-sensitive display, the touch sensor 106 allows the device 100 to render lines having respective darkness that corresponds to the user's touch.

FIG. 1 further illustrates that the electronic device includes one or more processors 108 and memory 110, as well as one or more network interfaces 112 and one or more power sources 114. The network interfaces 112 may support both wired and wireless connection to various networks, such as cellular networks, radio, WiFi networks, short range networks (e.g., Bluetooth), IR, and so forth.

Depending on the configuration of the electronic device 100, the memory 110 (and other memories described throughout) is an example of computer storage media and may include volatile and nonvolatile memory. Thus, the memory 110 may include, but is not limited to, RAM, ROM, EEPROM, flash memory, or other memory technology, or any other medium which can be used to store media items or applications and data which can be accessed by the electronic device 100.

The memory 110 may be used to store any number of functional components that are executable on the processors 108, as well as data and content items that are rendered by the electronic device 100. Thus, the memory 110 may store an operating system and a storage database to store one or more content items, such as eBooks, audio books, songs, videos, still images, and the like. The memory 110 of the electronic device 100 may also store one or more content presentation applications to render content items on the device 100. These content presentation applications may be implemented as various applications depending upon the content items. For instance, the application may be an electronic book reader application for rending electronic books, an audio player for playing audio books or songs, a video player for playing video, and so forth.

As illustrated, in this example the memory 110 stores a multi-mode display module 116 as well as indications of multiple different waveform modes 118 and display-update modes 120 for rendering content on the display 102. In response to receiving a request to render an image on the display 102, the multi-mode display module 116 is configured to render multiple versions of the image utilizing multiple different modes. For instance, the module 116 may utilize multiple different waveform modes 118 for altering positions of particles of the electronic paper display 102 and/or may utilize multiple different display-update modes for updating the display 102.

In some instances, in response to receiving a request to render an image, the multi-mode display module 116 renders a version of the image using a first mode that takes less time to render than does a second mode. For instance, the first mode may render a black and white version of an image, while a second mode may render a grayscale version of the image. By first rendering a black and white version, the module 116 ensures that a user of the device 100 receives prompt visual feedback in response to requesting to view an image.

In addition, by utilizing the second mode to render the second version of the image, the user receives a high quality image relatively shortly after viewing the first version of the image. In some instances, the module 116 renders the second version of the image while the first version of the image is still rendered on the screen and without interrupting the display of this first version. Furthermore, in some instances the module 116 may utilize multiple additional modes (e.g., a third mode, a fourth mode, etc.) to render an even higher-quality final image.

In one example, the multi-mode display module 116 first renders an image using a two-color waveform mode (e.g., black and white), either by posterizing each pixel to black and white or by rendering black and white pixels and refraining from rendering gray pixels. In either instance, the module 116 may thereafter render the image in a four-color waveform mode (e.g., black, white, and two shades of gray). Furthermore, the module 116 may then render the image using a sixteen-color waveform (e.g., black, white, and fourteen shades of gray) and/or any other waveform. In each instance, the module 116 may render the image without flashing the screen, such that any previously rendered pixels remain on the display and are not removed. Instead of clearing these pixels, the module 116 may effectively sharpen or clarify the already rendered image.

In other instances, the multi-mode display module 116 may first render an image using a first mode before sensing a trigger and, in response, rendering an image using a second different mode. For instance, as a user of the electronic device 100 draws a line on the touch-sensitive display 102, the module 116 may initially render the resulting line using a mode that is relatively fast. For instance, the module 116 may render the line using a display-update mode that renders black and white pixels. By doing so, the user views a line on the display 102 nearly immediately after requesting to draw the line on the display 102 (e.g., by dragging the writing instrument across the display 102).

However, once the user ceases the drawing of the line (e.g., by removing the writing instrument from the display 102), the multi-mode display module 116 may render the image using a second mode. For instance, the module 116 may utilize a display-update mode that is slower but renders additional colors (e.g., black, white, and two shades of gray). By doing so, the module 116 renders a higher quality image than originally rendered by the first mode. Furthermore, by utilizing both modes, the module 116 ensures that the user receives prompt feedback when drawing the line while increasing the quality of the line when the user removes the writing instrument from the display 102.

FIG. 1 further illustrates that the memory 110 may store a dithering module 122. At a high level, the dithering module 122 allows the display 102 to render colors based on an amount of pressure of a user's touch, such that a user is able to draw a relatively light line by providing a relatively light touch and vice versa. To do so, the dithering module 122 alters between rendering content in different modes with reference to one or more pressure thresholds 124. The pressure thresholds 124 may be based on pressure alone, pressure in combination with time, or the like.

For instance, when a user draws a line on the touch-sensitive display 102, the dithering module 122 may receive an indication of this touch and an amount of pressure of this touch from the touch sensor 106 as the touch moves across the display. The dithering module 122 may then compare this potentially variable pressure to a first pressure threshold. In response to determining that the pressure is less than the first pressure threshold, the dithering module may render the line using a first mode (e.g., a waveform mode or a display-update mode). For instance, the dithering module 122 may utilize a mode that allows for the rendering of black, gray, and white pixels. By utilizing a mode that allows for gray pixels in response to detecting a relatively light touch, the dithering module is able to render relatively light-colored lines in accordance with the light touch.

For instance, envision that the touch sensor 106 indicates that user is drawing a line at 10% pressure, where zero represents no pressure and 100% represents maximum pressure. In response, the dithering module 122 may compare this pressure to a first threshold (e.g., 70%) and may determine that this pressure is less than the threshold. As such, the dithering module 122 may render the line using a mode that allows for the rendering of the following four colors: white (0% black), a first intermediate gray (25% black), a second intermediate gray (75% black), and black (100% black).

In response to receiving an indication of this touch, the dithering module 122 may determine a mixture of white, gray, and/or black pixels that results in a line having a darkness corresponding to a touch having a 10% pressure. For instance, the dithering module may decide to render the line in a dithered manner out of 60% white pixels and 40% first-intermediate-gray pixels. By doing so, the dithering module 122 may render a line that is perceptible to the human as gray (having approximately 10% black), in accordance with the 10% pressure read by the touch sensor.

If, however, the touch sensor 106 thereafter indicates that the pressure of the touch has increased to beyond the first pressure threshold, then the dithering module 122 may render the line using a different mode. For instance, the dithering module 122 may utilize a mode that supports fewer colors, such as a mode that is able to render black and white pixels but not gray pixels (or fewer gray pixel values). In this example, envision that the touch sensor 106 indicates that the user is now drawing the line with a pressure of 80% (greater than the example 70% threshold). In response, the dithering module may render the line in a dithered manner using 80% black pixels and 20% white pixels. Again, this line may be perceptible to the human eye as black (80% black) even though in reality it is a mixture of black and white pixels.

In addition, the dithering module 122 may continue to render the line in this second mode until the pressure of the touch either rises above or falls below another threshold. For instance, the dithering module 122 may continue to render the line using the two-color mode until the pressure of the touch falls below 50%. By making this second threshold less than the first, the dithering module 122 avoids the situation where the module 122 is constantly switching modes due to the user providing pressure near the first threshold (e.g., 70%). In addition or in the alternative, the dithering module 122 may reference a threshold that requires the user to provide a pressure that is greater than or less than a threshold pressure for a threshold amount of time prior to switching modes, thereby avoiding the constant switching of modes.

In the instant example, envision that the touch sensor 106 indicates that the user has lightened their touch while drawing, with the pressure now residing at 45%. Because this is less than the example second threshold (50%), the dithering module may switch to rendering the line using the first mode having the additional colors. In addition, the dithering module 122 may determine a mixture of black, gray, and/or white pixels to achieve the 45% darkness and may render this mixture of pixels in a dithered manner.

Furthermore, in some instances a user may draw on a same pixel more than one time. For instance, a user may draw on a particular pixel with a 50% pressure before later drawing on the pixel with a 20% pressure. In that instance, the dithering module 122 may avoid darkening the pixel, since the line drawn with 20% pressure should not make an effect on the line previously drawn at 50% darkness.

As such, the dithering module 122 may store an indication of the currently rendered darkness of each pixel and may compare each pressure indicated at a particular pixel to its currently rendered darkness. The dithering module 122 may then darken the pixel based on the indicated pressure when this pressure is greater than the current state of the pixel by some threshold amount. Therefore, in the example above, the dithering module 122 would refrain from altering the state of the pixel having the 50% darkness in response to the later touch on that pixel having a 20% pressure. Conversely, the dithering module 122 may darken a pixel having 0% darkness in response to receiving that same 20% pressure.

In addition to the above, the example electronic device 100 may include a supersampling module 126. The supersampling module 126 may function to darken one or more pixels of the electronic paper display 102 based on an amount of surface area of the pixel(s) that has been touched. For instance, if a user draws entirely over a particular pixel, then the supersampling module 126 may reference an area-to-shade map 128 that indicates that the pixel(s) should be rendered black. Conversely, if the user draws over one quarter of the pixel(s), the area-to-shade map 128 may indicate that the supersampling module 126 should render the pixel as an intermediate gray (e.g., 25% black). Of course, in some instances the final determination of the color of the pixel(s) may be based on other factors as well, such as the pressure of the touch as described immediately above with reference to the dithering module 122.

In order to determine how much surface area of a pixel a user's touch has contacted, the supersampling module 126 may define an N×N grid that collectively represents the pixel(s) on the electronic paper display 102. For instance, the module 126 may define a four-by-four grid and may determine how many of the sixteen regions a particular touch contacts. After summing up this number, the module 126 may then reference the area-to-shade map 128 to determine a shade to render the corresponding pixel(s). For instance, if the electronic paper display 102 is able to render sixteen different shades (e.g., white, black, and fourteen shades of gray), then the area-to-shade map 128 may indicate that the module 126 should render an intermediate gray (25% black) in response to a touch that contacts four regions of a pixel's sixteen-region grid.

In addition, the module 126 may store a value of the selected shade (and/or the amount of surface area contacted) in the event that the one or more pixels experience a second touch. For instance, in the above example envision that a user draws on a portion of one or more pixels sufficient to render the pixels as the intermediate gray (25% black). Thereafter, the module 126 may store an indication of this shade or the amount of area contacted to select this shade for the purpose of determining whether or not to further darken the pixel(s) in response to a second touch that occurs before the user requests to erase this line. As such, when the pixel(s) experience a second touch as the user draws a line over the pixel(s), the module 126 may determine whether a greater or lesser amount of surface area of the pixel(s) has been contacted. If the second touch contacts a greater portion of surface area, then the module 126 may select a darker shade corresponding to this second touch (e.g., 40% black). If, however, the second touch contacts a lesser portion of the surface area than the first touch, then the module 126 may refrain from re-rendering content at the pixel(s). That is, the module 126 may leave the pixel(s) in their previous shade, just as a user would not expect a light line drawn over the top of a darker line to affect the already present darker line.

Finally, FIG. 1 illustrates that the memory 110 of the electronic device 100 may store a frame allocation module 130 that causes the display controller to cycle between updating the display 102 on behalf of each of multiple different requesting applications 132(1), . . . 132(N). For instance, envision that a first application 132(1) requests to render content on an upper-right portion of the display 102 at the same time that a second application 132(N) requests to render content on a bottom-left portion of the display. In order to ensure that each application's update is rendered smoothly and adequately, the frame allocation module 130 may allocate frames of the frame rate of the display 102 across the two applications. Of course, while this example describes allocating the frame rate across two applications, it is to be appreciated that the module 130 may allocate the frame rate across any number of requesting application or application components (which may form a portion of the same or different applications).

In the instant example, envision that the display 102 updates at a rate of thirty frames per second. As such, the module 130 may allocate this frame rate between the first application 132(1) and the second application 132(N). The module 130 may allocate the frame rate of the display 102 equally across each application requesting to render content on the display 102, or the module 130 may allocate the frame rate unequally based on one or more weighting factors 134. These weighting factors 134 may include a priority of the requesting application, predefined preferences of a user operating the device 100, and/or the like.

In this example, the module 130 may allocate the frame rate equally, such that the display controller 104 updates both the first application 132(1) and the second application 132(N) at a frame rate of fifteen frames per second. As such, the display controller 104 updates the first application 132 (1) at a first frame and the second application 132(N) at the second frame and then repeats this pattern. Because each application is requesting to update a bounded region of the display that is less than the entire display, the display controller 104 updates the corresponding region of the application while refraining from updating a remainder of the display.

The frame allocation module 130 may cause the display controller 104 to implement this allocation in any number of ways. For instance, the module 130 may instruct the applications themselves to request to update the display 102 according to the allocated frame rates (e.g., 15 times per second) or the module 130 may itself aggregate and vend these requests to the display controller 104 according to the allocated frame rate.

Furthermore, while FIG. 1 illustrates the frame allocation module 130 as residing in the memory 110, it is to be appreciated that other implementations may embed this functionality elsewhere. For instance, this functionality may reside in the display controller 104, in other locations of hardware and/or software of the device 100, or remotely from the device.

In some instances, the electronic device 100 may have features or functionality in addition to those that FIG. 1 illustrates. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 112 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 2A:
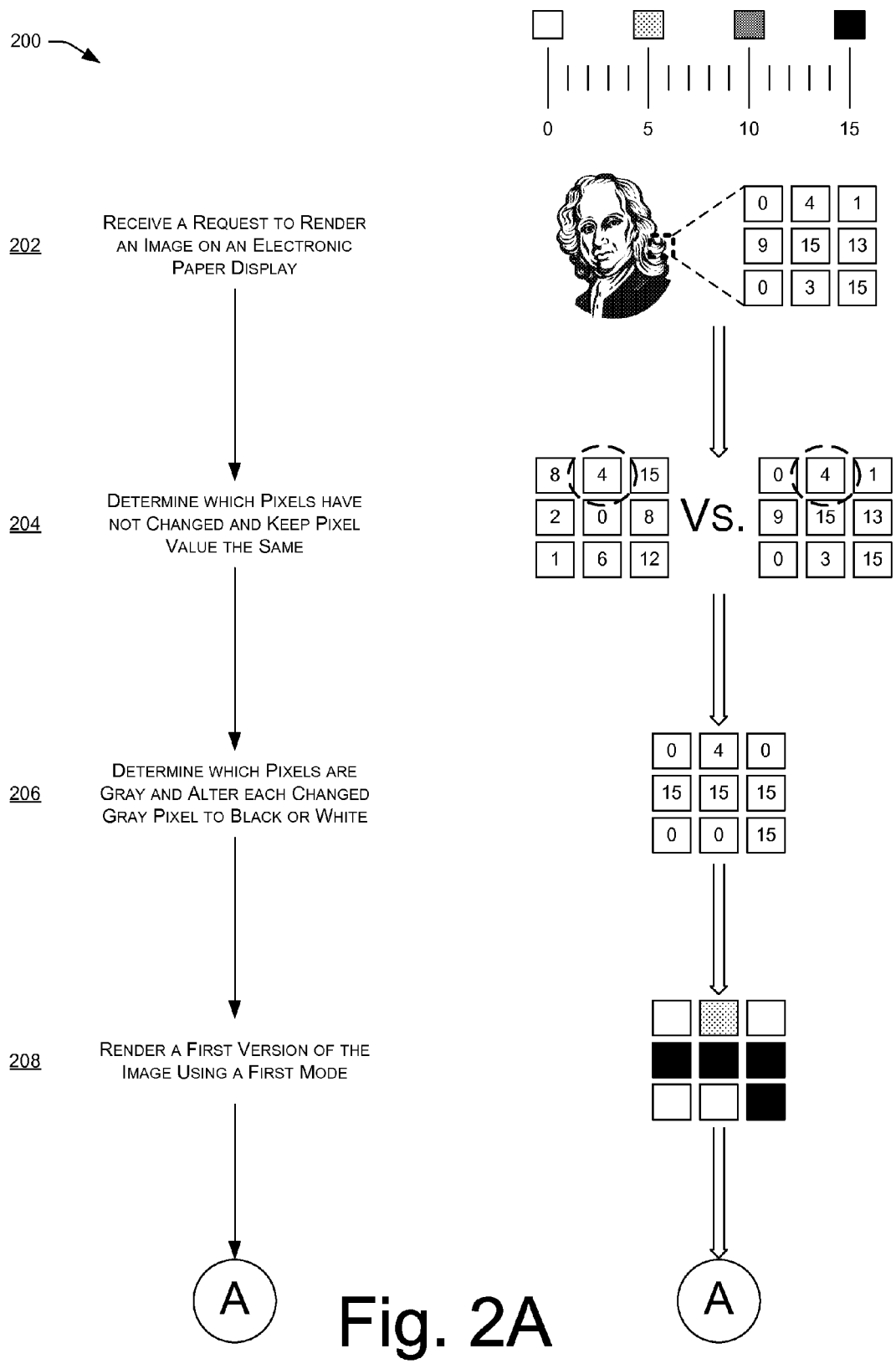
FIGS. 2A-2B illustrate an example process for receiving a request to render an image, quickly rendering a black and white version of the image, and thereafter rendering a grayscale version of the image to increase the perceived quality of the image.
Figure 2B:
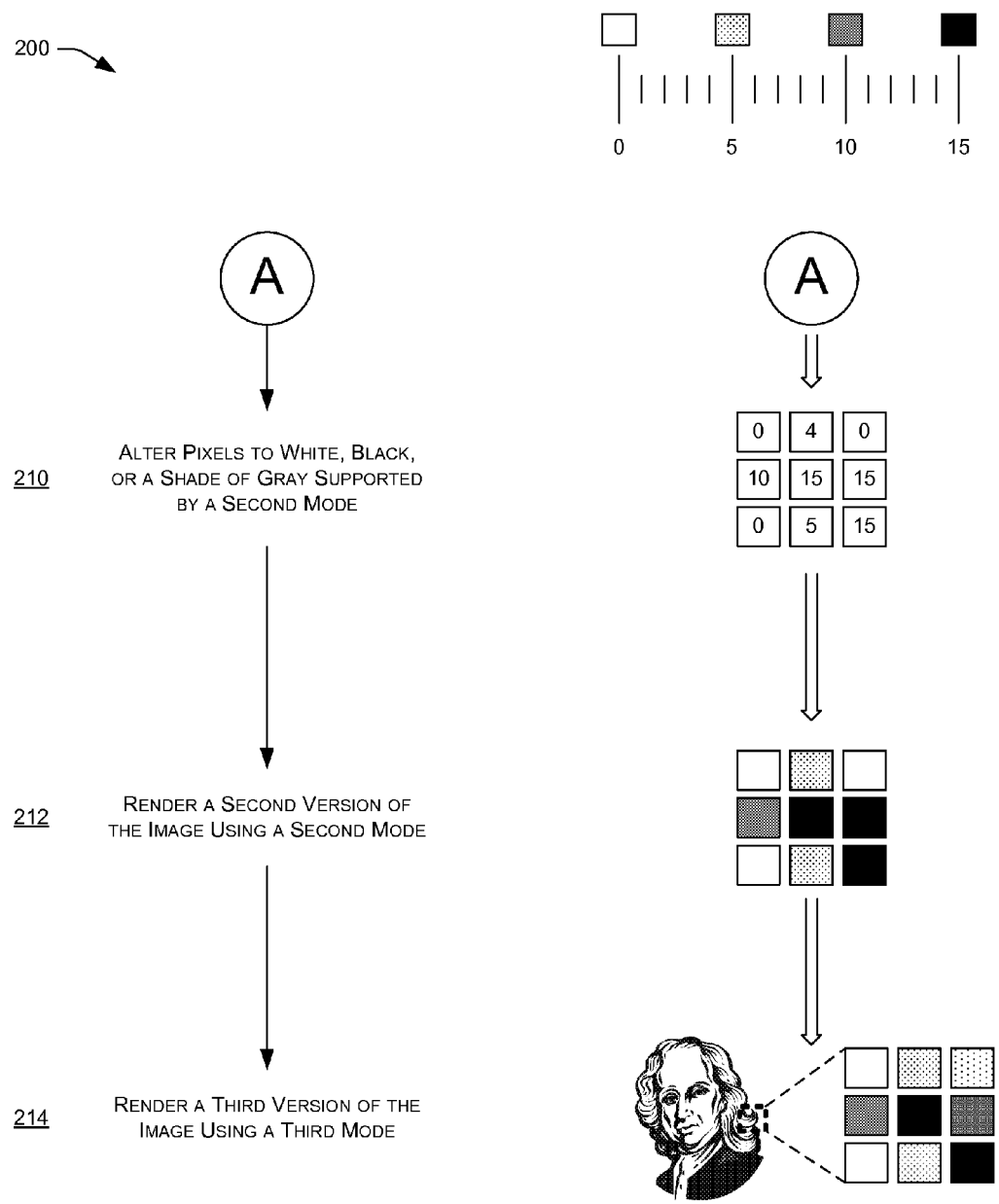

FIGS. 2A-2B illustrate an example process 200 for receiving a request to render an image, quickly rendering a first version of the image, and thereafter rendering a second version of the image to increase the perceived quality of the image. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 200 includes, at 202, the multi-mode display module 116 receiving a request to render a grayscale image on an electronic paper display. For instance, a user may turn a page while reading a book on the electronic device 100, may draw on the electronic device 100, may request to pop up a menu on the electronic device 100, or the like. At 204, the module 116 determines which pixels of the image have not changed in value between the image about to be rendered and the image previously rendered on the display. To do so, the module 116 may store a copy of the contents of the display buffer associated with the previous image and may compare these values to identify which pixels have changed and/or which pixels have not changed. In response to identifying one or more pixels that have not changed in value, the module 116 may keep these pixel values the same at 204. In this example, the pixel illustrated in the top row, middle column (having a value of "4") has not changed between images.

At 206, meanwhile, the module 116 may alter a value of each gray pixel that has in fact changed between images to one of black or white. That is, the module 116 may create a first version of the image by mapping gray pixels to black or white. In some instances, the module 116 may alter the pixels based on whether the pixel is closer to black or closer to white. For instance, in the illustrated example, one mode of the electronic paper display is capable of rendering white (represented as "0") and black (represented as "15"), while another mode is capable of rendering white, a first shade of gray (represented as "5"), a second shade of gray (represented as "10"), and black. In this example, yet another mode is capable of rendering white, black, and fourteen shades of gray ("1", "2", . . . , "14").

In this example, the module 116 alters the example pixels of the image having initial values of "1", and "3" to white. Conversely, the module 116 alters the example pixels of the image having initial values of "9" and "13" to black. In addition, the module 116 leaves the value of the pixel that did not change as "4". In other instances, meanwhile, the module 116 may alter the gray pixels to white or black based on these pixels being above or below a threshold value (e.g., any pixels above 3 are altered to black, and the remaining pixels are altered to white). In still other instances, the module 116 may refrain from altering these pixels (or "posterizing" the image).

Returning to FIG. 2A, at 208 the module 116 renders a first version of the image using a first mode. As discussed above, the first mode may render the black and white pixels of the image more quickly than other modes that render respective grayscale versions of the image.

FIG. 2B continues the illustration of the process 200. At 210 the module 116 may again alter a value of each initially gray pixel (that has not changed between images) to white, black, or a shade of gray supported by a second mode. Again, the module 116 may alter these pixel values in any number of ways, such as by rounding the pixels up, rounding the pixels down, or by rounding the pixels to a closest supported color. In this example, the second mode of the display supports white, black, and the two grays discussed above. As such, in this example the module 116 alters each of the initially gray pixels to have values of one of "0", "5", "10", or "15".

At 212, the module 116 renders a second version of the image using the second mode. In one example, the module 116 renders a grayscale version of the image where each pixel is one of "0", "5", "10", or "15". The module 116 may render this version of the image while the generally black and white version of the image is being rendered. As such, the user viewing the display sees clarification of the image but does not see the image disappear.

Finally, at 214 the module 116 renders a third version of the image using a third mode. As discussed above, this mode may support sixteen different colors and, as such, the module 116 may render the image according to the initial values of the image. While this process 200 illustrates rendering an image using three different modes, it is to be appreciated that other implementations may render images using any other number of modes (two, four, ten, etc.) supporting any other pixel values.

Figure 3A:
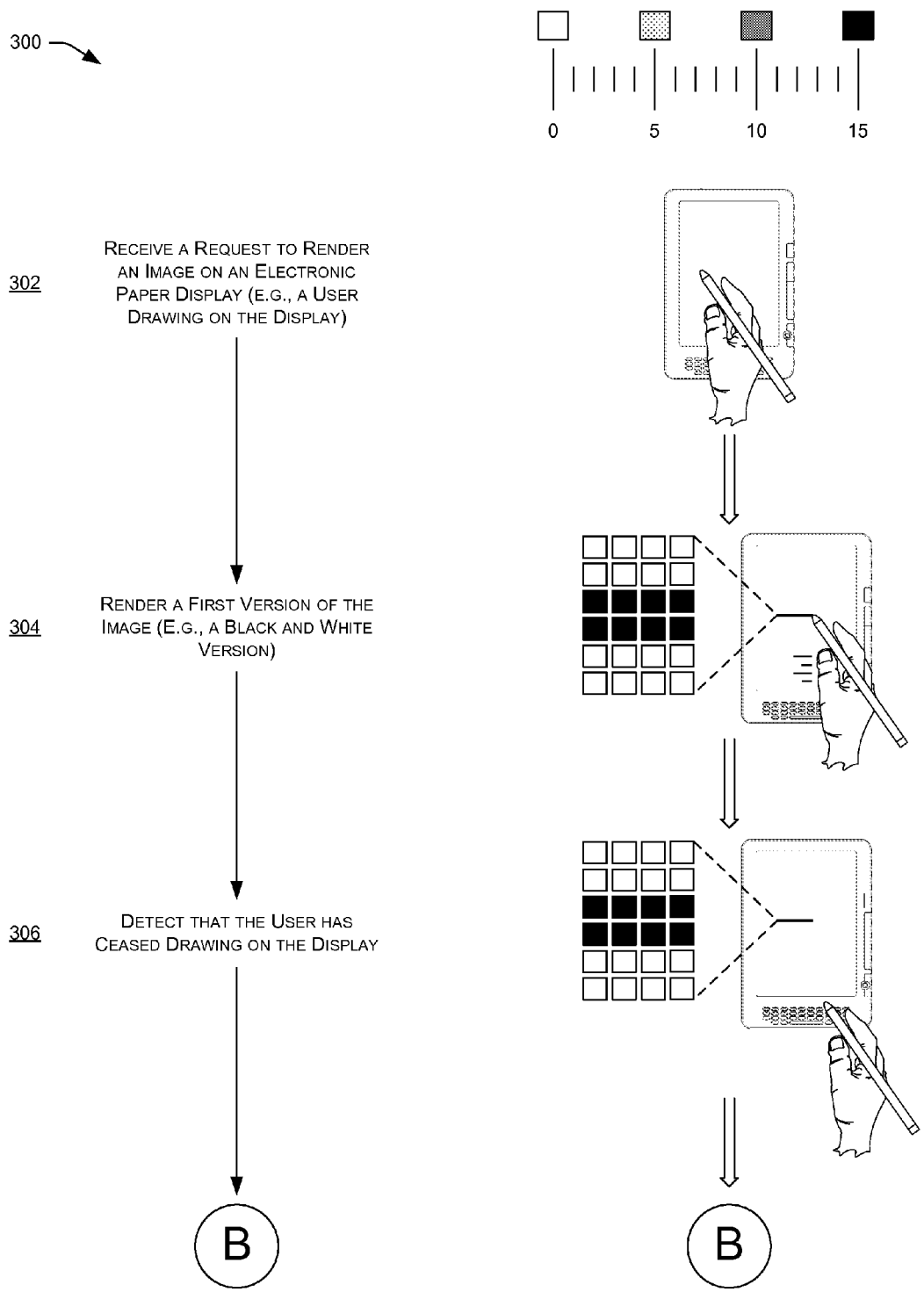
FIGS. 3A-3B illustrate an example process for rendering a first version of an image in response to a user drawing on an electronic paper display of a device and, in response to detecting that the user has ceased drawing on the display, rendering a second version of the image. In some instances, the first version of the image includes black and white pixels while the second version includes black, white, and gray pixels.
Figure 3B:
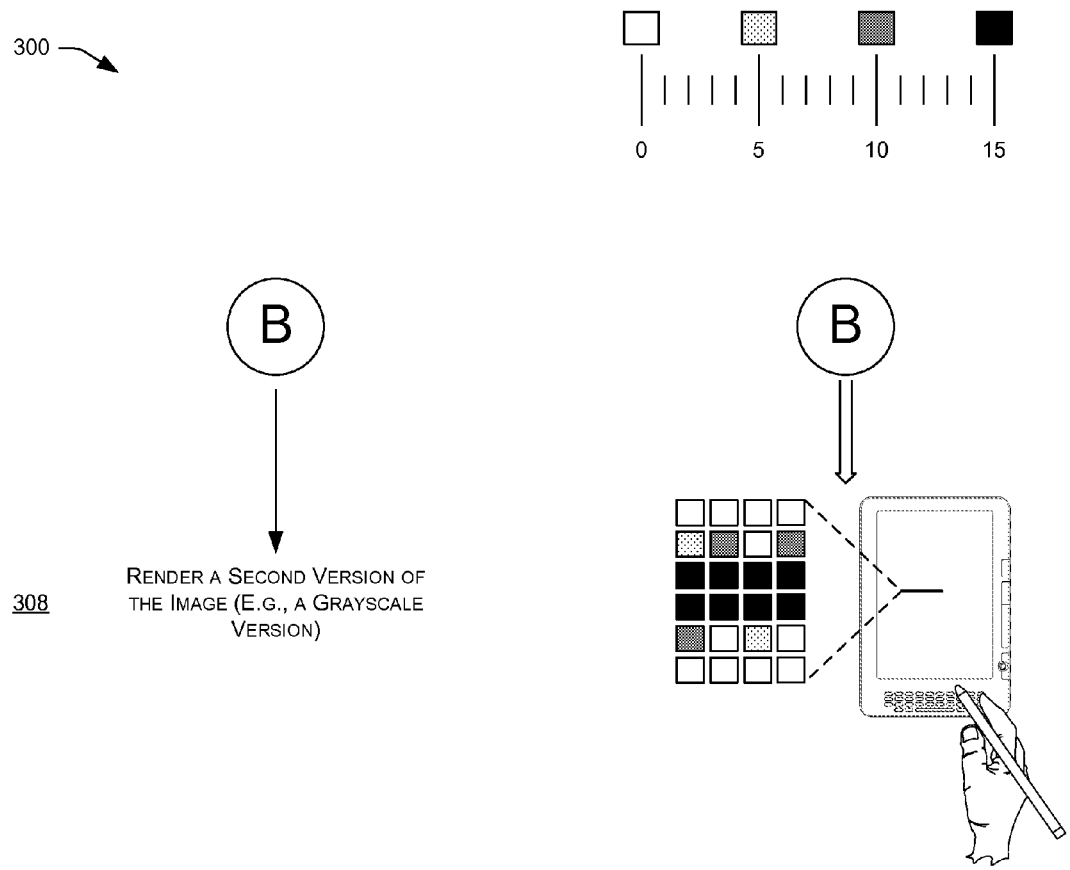

FIGS. 3A-3B illustrate an example process 300 for rendering a first version of an image in response to a user drawing on an electronic paper display of a device and, in response to detecting that the user has ceased drawing on the display, rendering a second version of the image. In some instances, the first version of the image includes black and white pixels while the second version includes black, white, and gray pixels.

The process 300 includes, at 302, the multi-mode display module 116 receiving a request to render an image on an electronic paper display. For example, this request may come in the form of the user beginning to draw a line with a writing instrument on a touch-sensitive display of the electronic device 100.

At 304, the module 116 renders a first version of the image, such as a black and white version of the image or a version of the image having black, white, and a limited number of grays. At 306, the module 116 receives an indication (e.g., from the touch sensor) that the user has ceased drawing on the display.

FIG. 3B continues the illustration of the process 300 and shows, at 308, that the module 116 may render a second version of the image in response to receiving the indication at 306. For instance, the module 116 may render a grayscale version of the image (or a higher-quality grayscale version of the image). As discussed above, by quickly rendering an initial black and white version of the drawn line on the display and then following up with a higher-quality line when the user ceases drawing, the module 116 provides both a fast initial response and a high-quality end product to the writing user.

Figure 4:
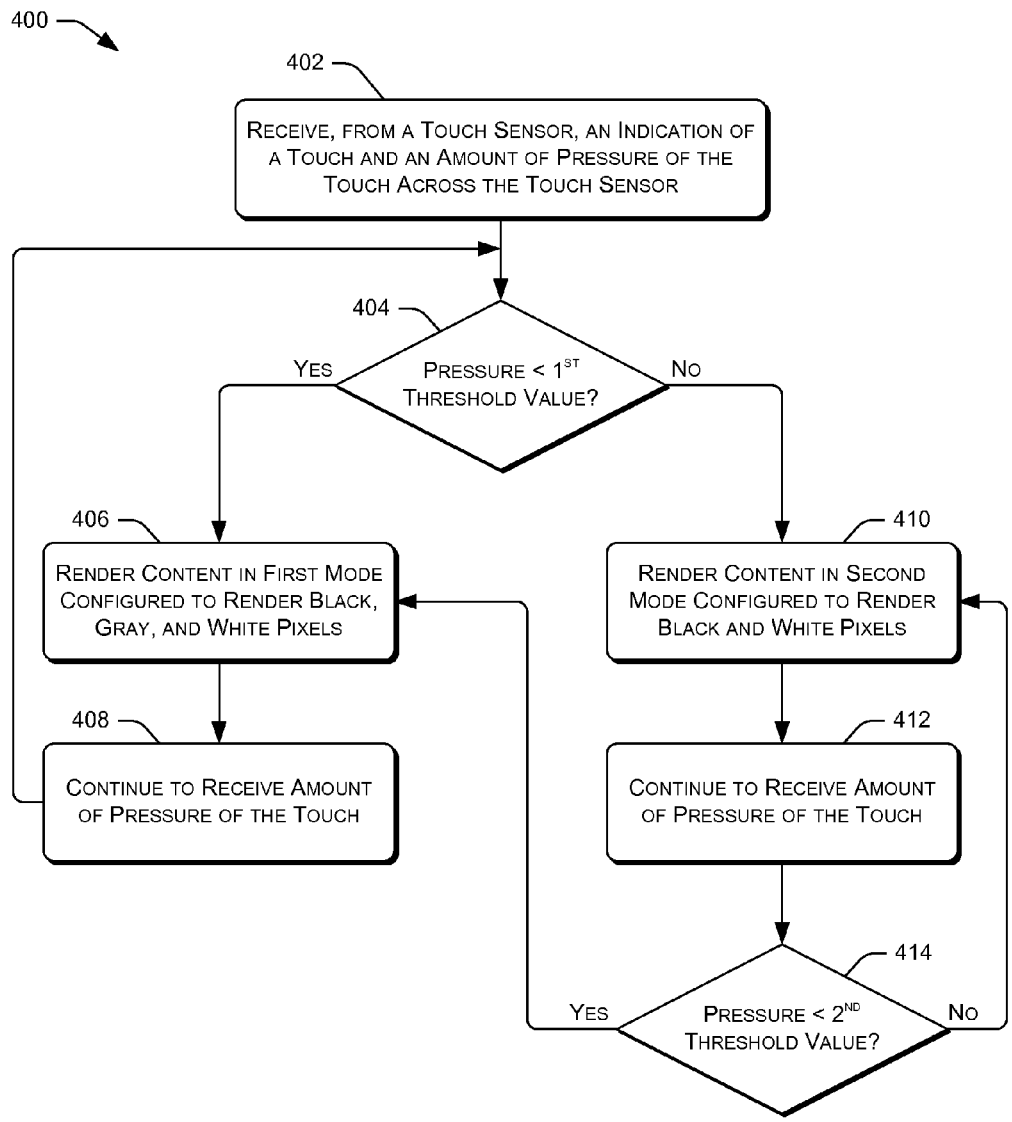
FIG. 4 illustrates an example process for rendering content with use of different modes based at least in part upon an amount of pressure of a touch on a touch-sensitive display.

FIG. 4 illustrates an example process 400 for rendering content with use of different modes based at least in part upon an amount of pressure of a touch on a touch-sensitive display. The process 400 includes, at 402, the dithering module 122 receiving, from a touch sensor, an indication of a touch and an amount of pressure of the touch across the touch sensor. This may comprise, for instance, a user drawing on the touch-sensitive display with use a stylus, finger, or other writing instrument.

At 404, the dithering module 122 queries whether the amount of pressure of the touch is less than a first threshold value. If so, then at 406 the module 122 renders content in a first mode that is configured to render black, gray, and white pixels. Because the touch is relatively light, the dithering module 122 utilizes a mode that is configured to render gray and, hence, that is capable of rendering lightly-shaded lines in accordance with light-touches of the user.

In addition to and after rendering the content, however, the dithering module 122 continues to receive, at 408, indications of the varying amounts of the pressure of the touch from the touch sensor as the user draws across the touch-sensitive display. In addition, the dithering module 122 continues to compare these pressure values against the first threshold value.

After determining that a touch has exceeded the first threshold value, the dithering module 122 renders, at 410, content in accordance with the touch using a second mode that is configured to render black and white pixels (but not gray pixels). Because the user is now providing a relatively hard touch, the module 122 has transitioned to utilizing a mode that is both fast to render and that provides black pixels to create relatively dark lines corresponding to the relatively hard touches.

At 412, the dithering module 122 continues to receive the pressure values from the touch sensor as the touch moves across the display. At 414, the dithering module 122 determines whether the amount of these pressure values has fallen below a second threshold value. As discussed above, this second threshold value may be less than the first threshold value in some instances so as to avoid the scenario where the module 122 is constantly jumping between modes.

If the reported pressures do not fall below the second threshold value, then the module 122 continues to render the content in the second mode. If, however, the reported pressure does fall below the second threshold value (e.g., without regard to time or for a threshold amount of time), then the dithering module 122 may transition back to rendering content in the first mode. For instance, as the user draws a lighter line, the module may switch back to rendering the line using a mode that supports the rendering of gray pixels.

Figure 5A:
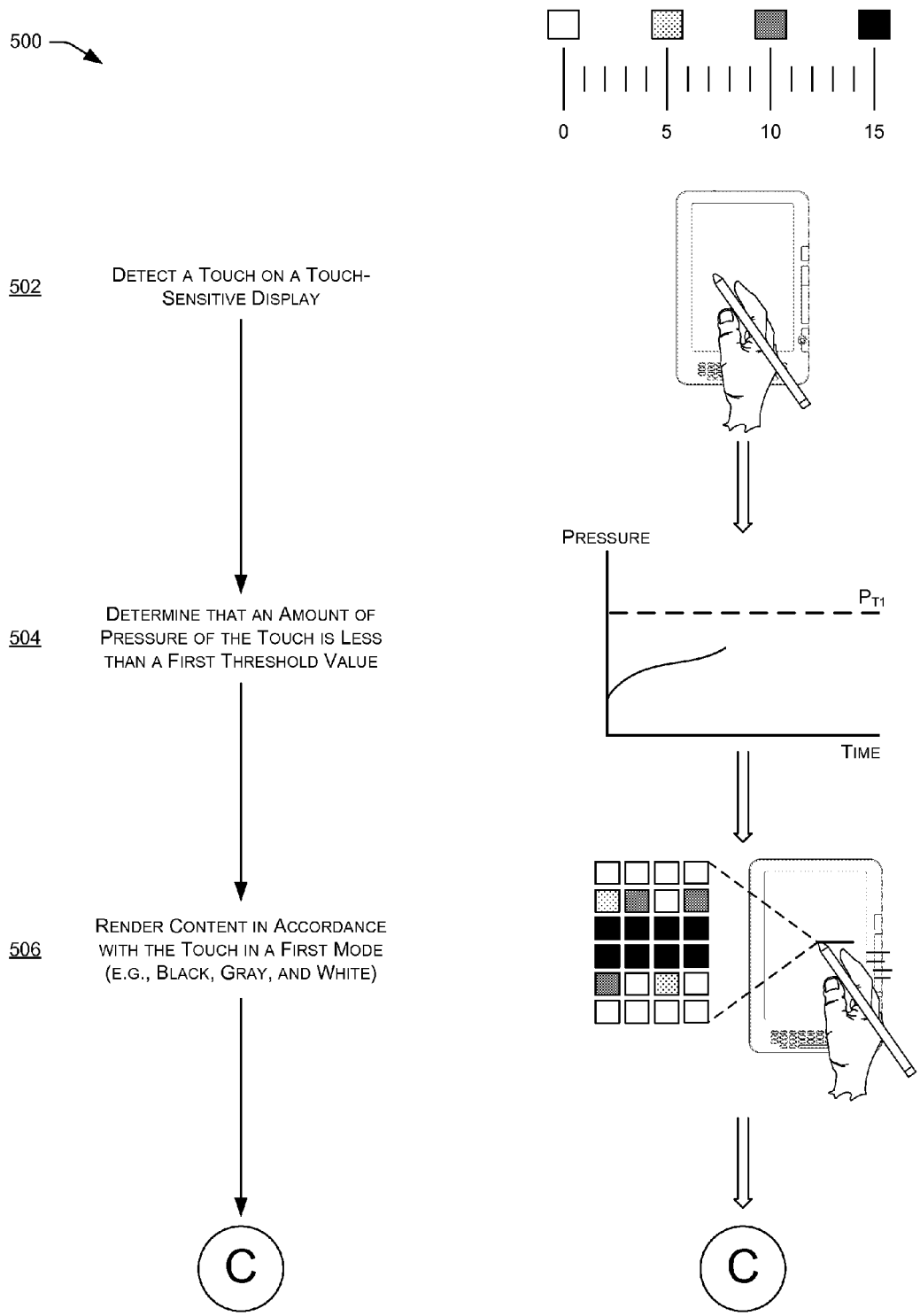
FIGS. 5A-5C illustrate an example process of rendering content in a first mode when an amount of pressure of a touch is less than a first threshold and rendering content in a second mode when the amount of pressure of the touch is no longer less than the first threshold. When rendering content in the second mode, the process may continue to monitor the pressure of the touch and, in the event that a touch sensor determines that this amount of pressure is less than a second threshold, may again render the content using the first mode.
Figure 5B:
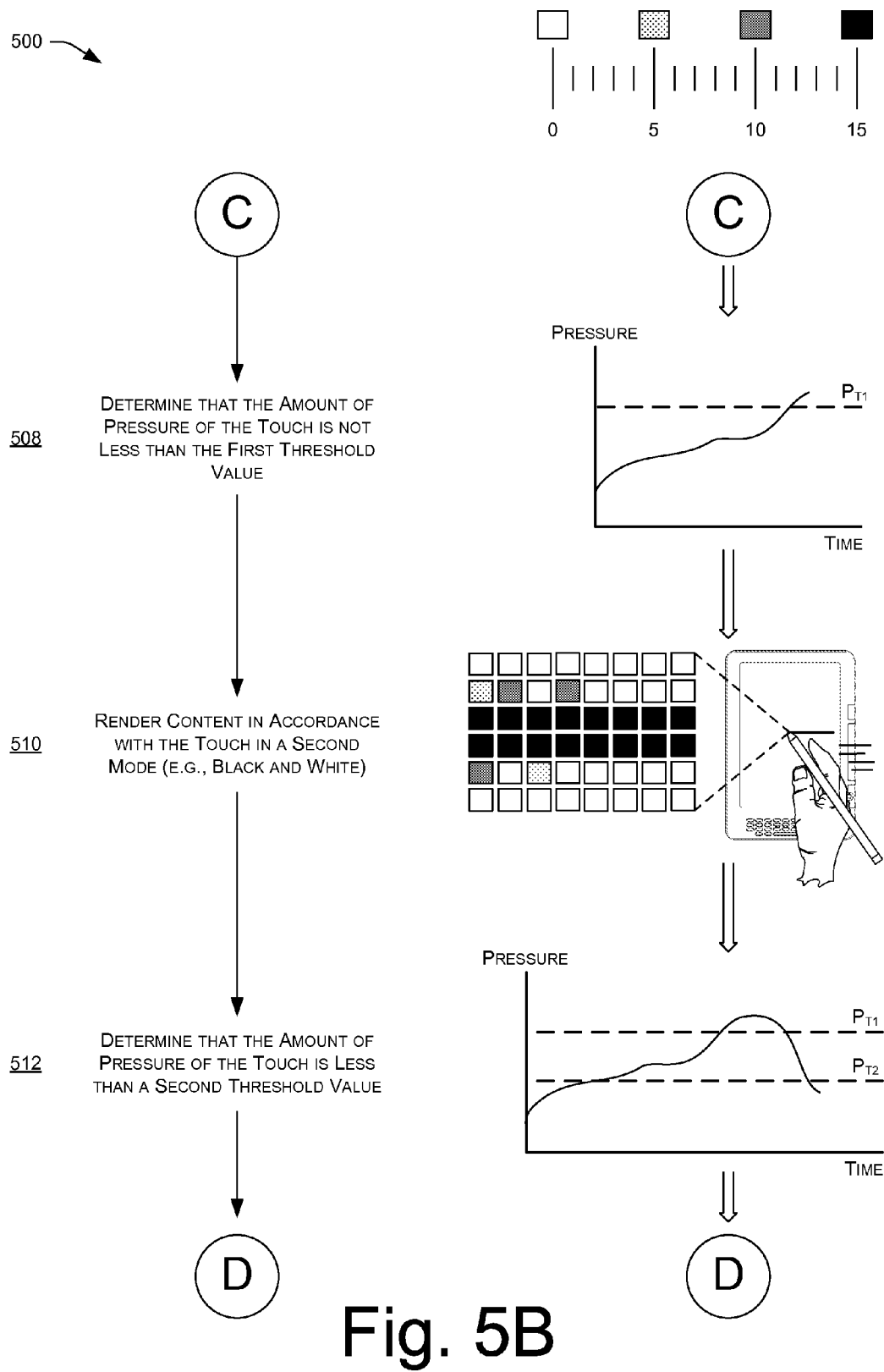
Figure 5C:
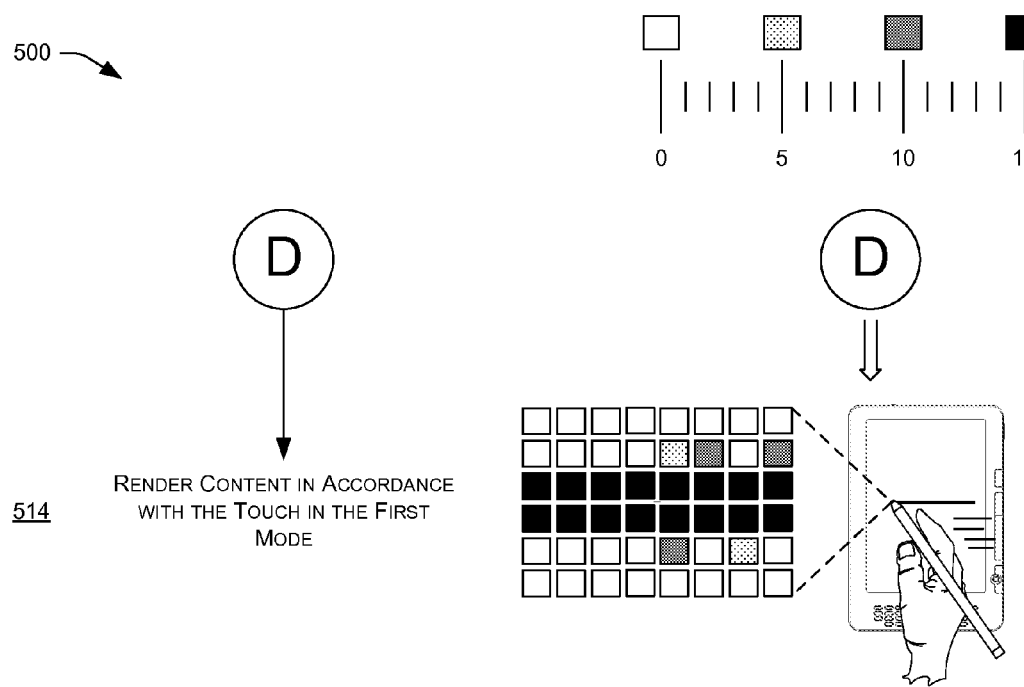

FIGS. 5A-5C illustrate an example process 500 of rendering content in a first mode when an amount of pressure of a touch is less than a first threshold and rendering content in a second mode when the amount of pressure of the touch is no longer less than the first threshold. When rendering content in the second mode, the process may continue to monitor the pressure of the touch and, in the event that a touch sensor determines that this amount of pressure is less than a second threshold, may again render the content using the first mode.

At 502, the touch sensor 106 detects a touch on the touch-sensitive display 102. In addition, the touch sensor may provide an indication of this touch and an amount of pressure of the touch to the dithering module 122. At 504, the dithering module 122 determines that the amount of pressure of the touch is less than a first threshold value. As such, at 506 the dithering module renders content in accordance with the touch in a first mode. For instance, the module 122 may render a line that includes blacks, whites, and/or grays on the display. Furthermore, the module 122 may dither this line by pseudo-randomly intermixing the different available shades, with the amounts of each shade being based at least in part on the pressure of the touch.

FIG. 5B continues the illustration of the process 500 and includes, at 508, the dithering module 122 determining that the pressure of the touch has now exceeded the first threshold. For instance, the user drawing the line on the display has now pressed harder while drawing the line, as received and indicated by the touch sensor. At 510, and in response, the dithering module 122 renders content in accordance with the touch in a second mode. The second mode may utilize black and white pixels. By switching to the second mode, the module 122 is able to quickly render the drawn line while not sacrificing the quality of the line (since the black pixels are sufficient for creating the dark line dictated by the heavy touch).

At 512, meanwhile, the dithering module 122 determines that the pressure of the touch has now fallen below a second threshold value. For instance, the drawing user may have lightened up while drawing the line. Again, the second threshold value may be less than the first threshold value in some instances.

FIG. 5C continues the process 500 and includes, at 514, the dithering module 122 again rendering content in according with the touch using the first mode. As this illustration depicts, the line has transitioned from black and white pixels to a dithered mixture of blacks, whites, and supported grays.

Figure 6A:
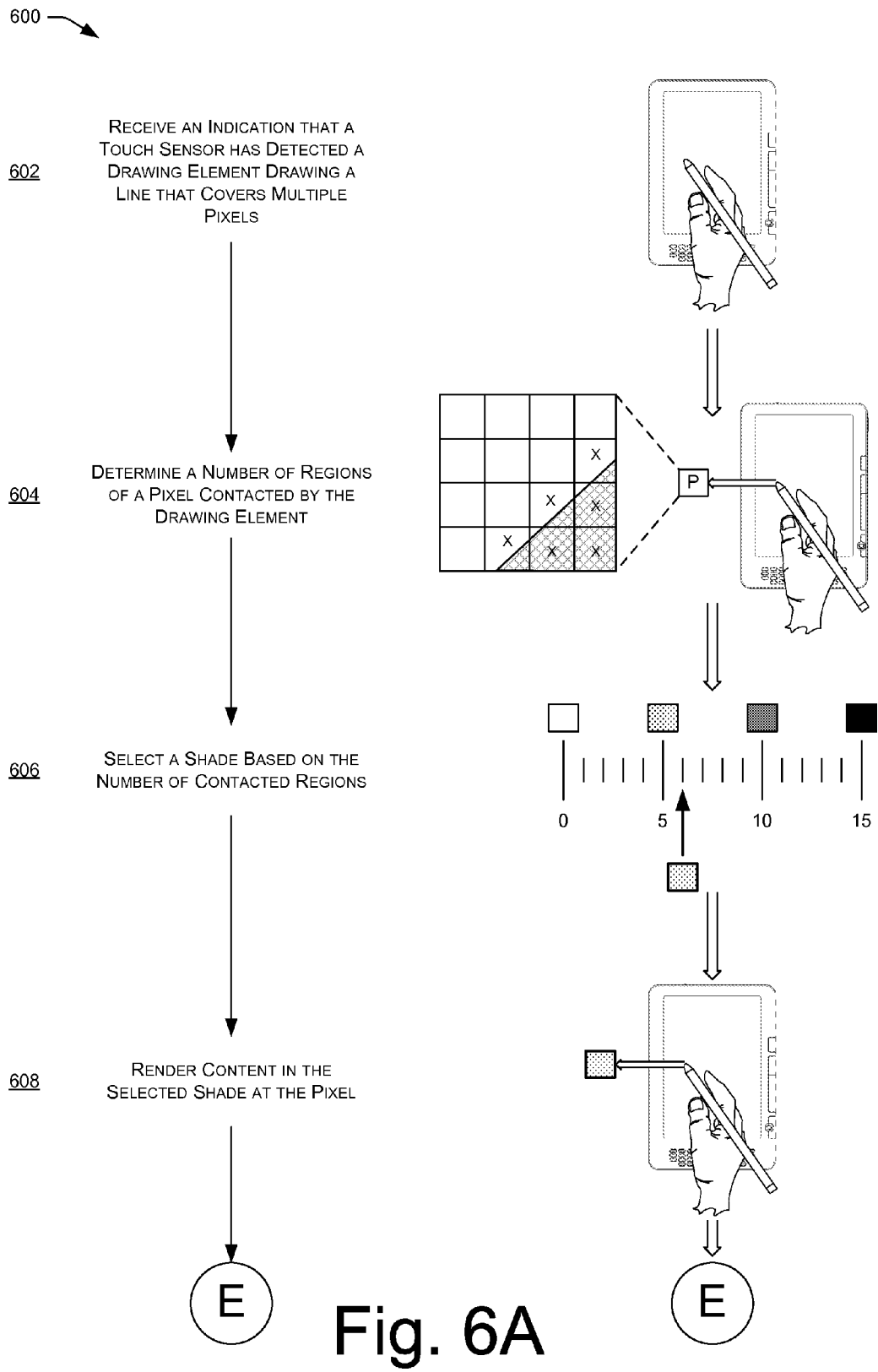
FIGS. 6A-6B illustrate an example process for selecting which of multiple shades to render on an electronic paper display based on an amount of surface area of one or more pixels that a touch has contacted. In some instances, the process selects a relatively lighter shade when the touch contacts a relatively smaller area of the pixel(s), and selects a relatively darker shade when the touch contacts a relatively larger area of the pixel(s).
Figure 6B:
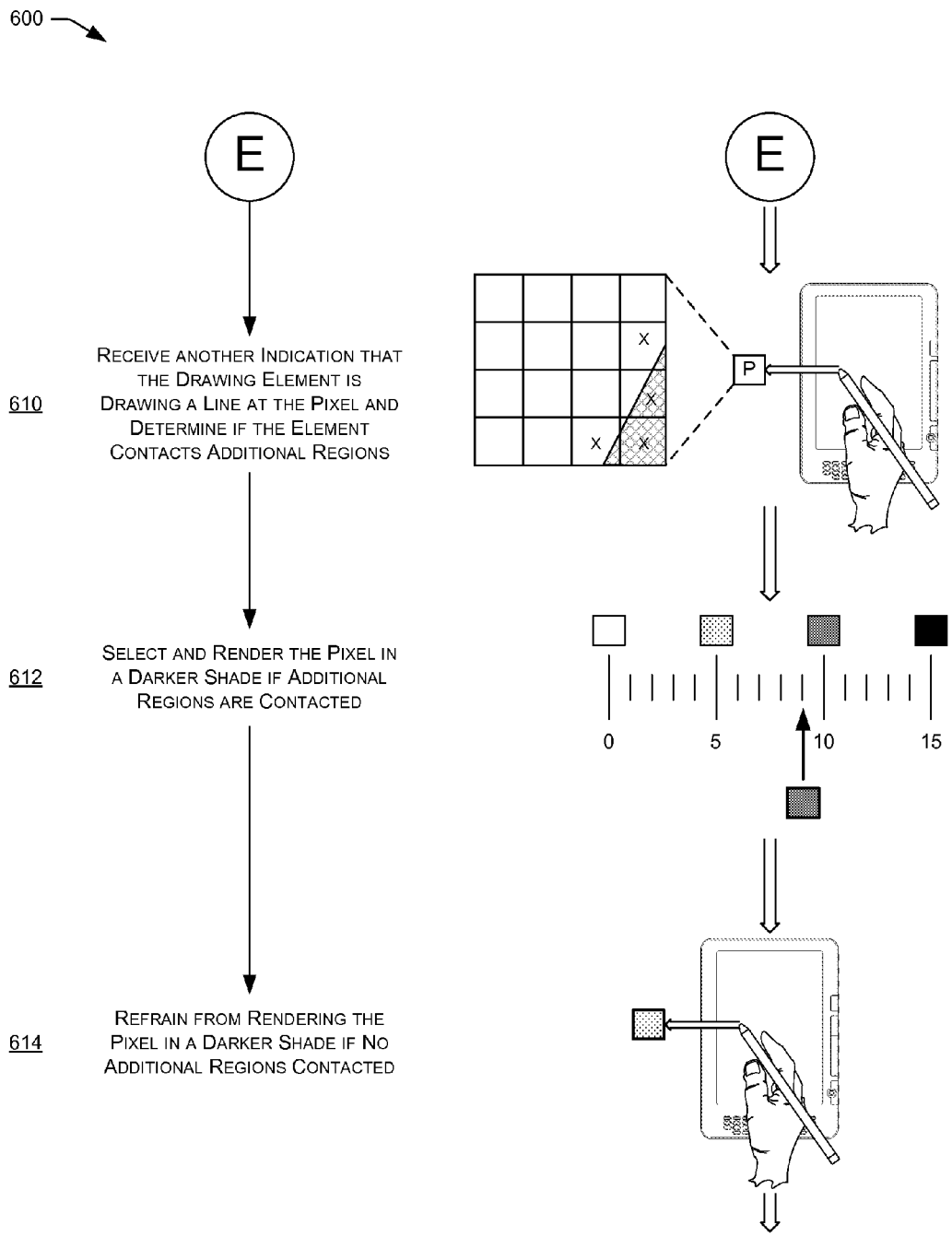

FIGS. 6A-6B illustrate an example process 600 for selecting which of multiple shades to render on an electronic paper display based on an amount of surface area of one or more pixels that a drawing element has contacted. In some instances, the process selects a relatively lighter shade when the drawing element contacts a relatively smaller area of the pixel(s), and selects a relatively darker shade when the drawing element contacts a relatively larger area of the pixel(s). In addition, the process 600 determines whether to render the pixel(s) in a darker shade in response to the drawing element again contacting the pixel(s). While this process 600 illustrates the techniques with reference to one pixel, it is to be appreciated that these techniques may apply to each pixel of a display contacted by a drawing element.

The process 600 includes, at 602, the supersampling module 126 receiving an indication that a touch sensor has detected a drawing element drawing a line that covers multiple pixels of an electronic paper display. At 604, the module 126 determines a number of regions of one such pixel contacted by the drawing element. For instance, the module may effectively zoom in on the selected pixel(s) and define an N×N grid of regions, which may correspond closely to the amount of shades supported by a particular mode of the electronic paper display. For instance and as illustrated, the module 126 may define a 16-region grid on the selected pixel, which closely corresponds to the sixteen available colors in a particular mode available to the electronic paper displays described herein. In this example, the module 126 determines that the touch contacted (at least partially) six of the sixteen regions.

At 606, the module 126 selects a shade to render the pixel based at least in part on the number of contacted regions of the pixel. In this example, for instance, the module 126 may select a shade corresponding to a "gray 6". In other instances, the module 126 may round the selected shade up or down to a supported shade (e.g., to a "gray 5" in instances where the mode supports four colors). At 608 the module 126 renders a portion of the drawn line in the particular shade at the pixel.

FIG. 6B continues the illustration of the process 600 and includes, at 610, the module 126 receiving another indication that the drawing element is again drawing a line at the pixel. For instance, a user may be scribbling on the display and may re-contact the same pixel that is still being rendered in the selected shade described above. In response, and also illustrated at 610, the module 126 may determine a number of the regions of the pixel contacted by the drawing element in this instance. If one or more regions other than the previously contacted regions have been contacted, then at 612 the module 126 may select a darker shade and may render the pixel in the darker shade. For instance, if two of the sixteen illustrated regions are contacted that were previously not contacted, than the module 126 may render the pixel in a shade that is two shades darker (e.g., a "gray 8"). In the illustrated, example, however, the drawing element contacts fewer regions (namely four regions), none of which are additional to the regions previously contacted. Because the element does not contact any additional regions, at 614, the module 126 refrains from rendering the pixel in a darker shade. By utilizing the techniques of the process 600, the module 126 may refrain from applying traditional anti-aliasing techniques without sacrificing quality of the resulting line.

Figure 7:
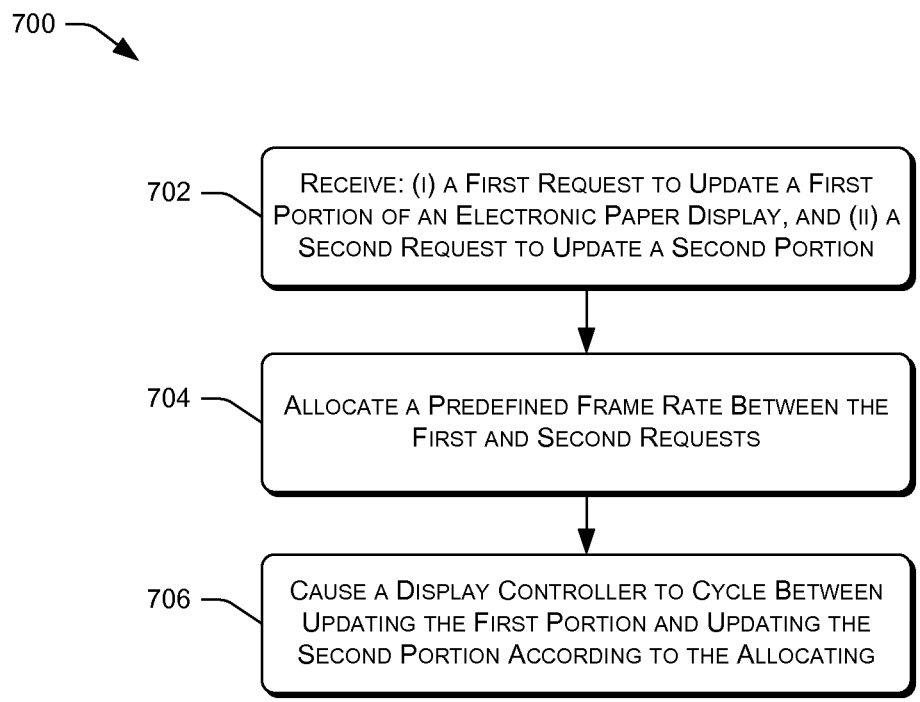
FIG. 7 illustrates a process for allocating frames of a frame rate of a display between two different update requests received from different application components. After allocating, the process causes the display controller to cycle between updating the portion of the display corresponding to the first request and updating the portion of the display corresponding to the second request.

FIG. 7 illustrates a process 700 for allocating a frame rate of a display between two different update requests received from different application components. After allocating the frame rate between these requests, the process causes the display controller to cycle between updating the portion of the display corresponding to the first request and updating the portion of the display corresponding to the second request.

The process 700 includes, at 702, the frame allocation module 130 receiving: (1) a first request to update a first portion of an electronic paper display from a first application component, and (2) a second request to update a second portion of the display from a second application component. These components may reside within the same or different applications in some instances.

At 704, the module 130 allocates a predefined frame rate of the display between the first and second requests. In instances where there are additional requests, the module 130 may also allocate the predefined frame rate between these additional requests. In the instant example, the module 130 may allocate the predefined frame rate of the display equally between the first and second requests, although in other instances the module 130 may allocate the frame rate unequally according to one or more weights associated with the respective requests.

At 706, the module 130 causes a display controller of the driver to cycle between updating the first portion of the display in accordance with the first request and updating the second portion of the display in accordance with the second request. As discussed above, the module 130 may achieve this by instructing the application components to send requests to update the display to the display controller in accordance with the allocated frame rate. Conversely, the module 130 may aggregate and vend these requests accordingly.

Figure 8:
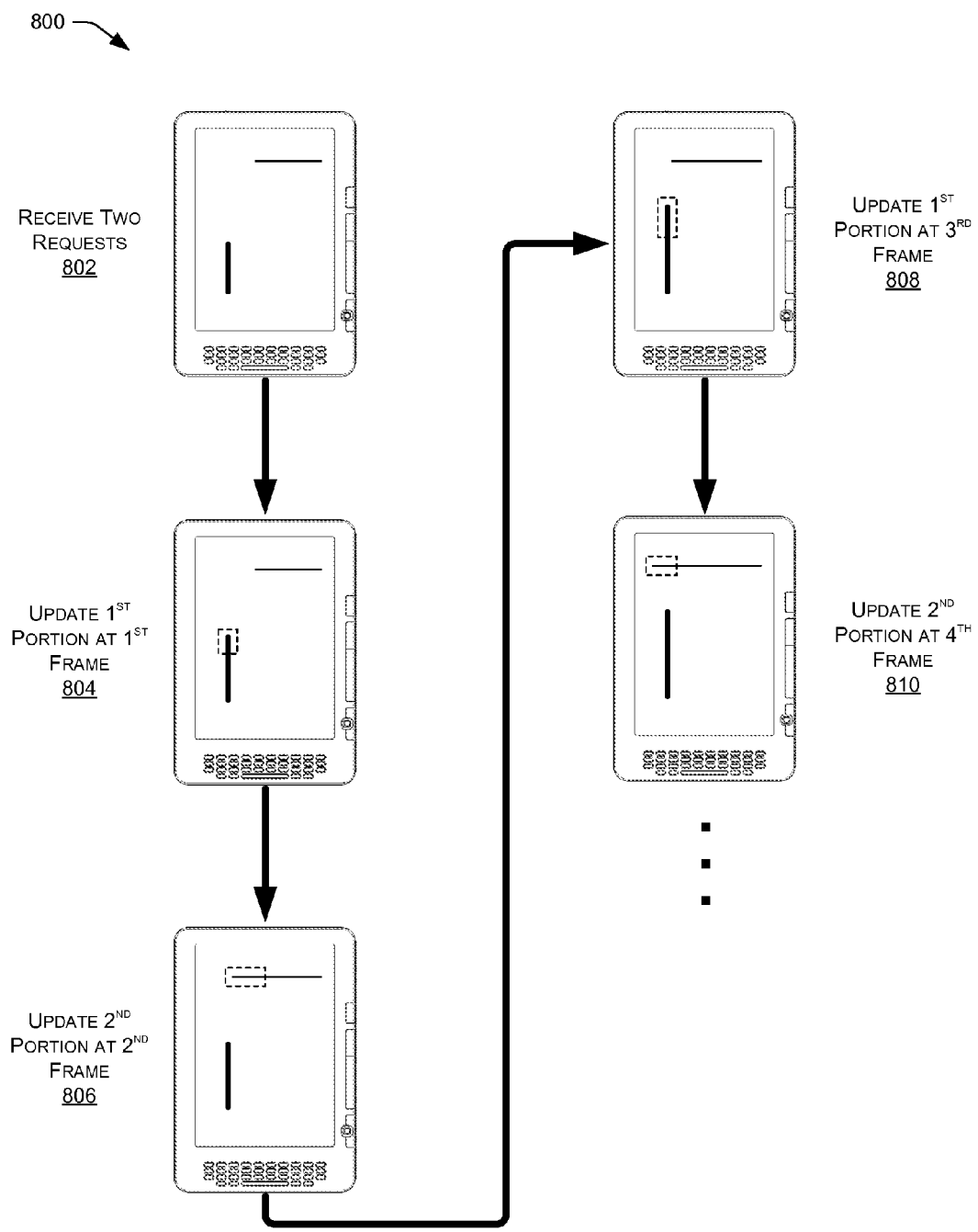
FIG. 8 illustrates an example process for updating different portions of a display based on an allocation of a frame rate of the display between multiple different requests.

FIG. 8 illustrates an example process 800 for updating different portions of a display based on an allocation of a frame rate of the display between multiple different requests, as described immediately above with reference to FIG. 7.

At 802, the process 800 receives two requests to update different portions of the display 102 of the electronic device. Specifically, a first application component requests to update a bottom-left portion of the display and a second application component requests to update a top-right portion of the display.

At 804, after allocating the frame rate of the display between the two requests (equally in this example), the process 800 updates the first portion of the display during a first frame in accordance with the first request. As illustrated by the bounding box, the process 800 updates a portion of the line associated with the first request. Next, at 806, the process 800 updates the second portion of the display during a second frame in accordance with the second request. Again, a bounding box represents the process 800 updating a portion of the line associated with the second request. The process then proceeds to again update the first portion of the display during a third frame at 808, before again updating the second portion of the display during a fourth frame at 810. As illustrated, the process 800 continues in this manner until one or both of the processes completes the update or until an additional application component requests to update an additional portion of the display, thereby resulting in a reallocation of the predefined frame rate of the display.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    under control of an electronic device that includes an electronic paper display and a touch sensor and that is configured with executable instructions that include at least instructions for performing a flashing clear and instructions for performing a non-flashing clear,
    receiving a first indication, from the touch sensor, that a first drawing element is being used to draw an image that includes black, gray, and white pixels on the electronic paper display;
    at least partly in response to the receiving the first indication, rendering an original version of the image that includes the black, gray, and white pixels on the electronic paper display;
    receiving a second indication, from the touch sensor, that at least one of the first drawing element or a second drawing element is being used to erase a first portion of the image; and
    at least partly in response to the receiving the second indication:
        executing the instructions for performing the non-flashing clear to render a ghosted version of the first portion of the image on the electronic paper display, wherein subsequent to the executing the instructions for performing the non-flashing clear, the ghosted version of the first portion of the image remains at least partially perceptible and lighter than the original version of the first portion of the image; and refraining from altering the ghosted version of the first portion of the image.

2. A method as recited in claim 1, further comprising rendering a black and white version of the image prior to the rendering the original version of the image, wherein the rendering of the black and white version of the image comprises assigning a value of at least some gray pixels, of the black, gray, and white pixels, to one of black or white.

3. A method as recited in claim 2, wherein the assigning comprises:
   determining, for each respective gray pixel of the original version of the image, whether the value of the gray pixel is nearer black or nearer white; and
   assigning the value of the gray pixel to black at least partly in response to determining that the value of the gray pixel is nearer black; or
   assigning the value of the gray pixel to white at least partly in response to determining that the value of the gray pixel is nearer white.

4. A method as recited in claim 2, wherein the assigning comprises:
   determining, for a gray pixel of the original version of the image, whether the value of the gray pixel is less than a threshold value; and
   assigning the value of the gray pixel to white at least partly in response to determining that the value of the gray pixel is less than the threshold value; or
   assigning the value of the gray pixel to black at least partly in response to determining that the value of the gray pixel is equal to or greater than the threshold value.

5. A method as recited in claim 2, wherein the original version of the image is rendered more slowly than the black and white version.

6. A method as recited in claim 2, wherein rendering the black and white version of the image and rendering the original version of the image are performed using one or more display-update modes.

7. A method as recited in claim 2, wherein rendering the black and white version of the image and rendering the original version of the image are performed using one or more waveform modes.

8. A method as recited in claim 1, wherein the rendering the original version of the image comprises using a different waveform mode for altering positions of particles of the electronic paper display than the instructions for performing the non-flashing clear to render the ghosted version of the image.

9. A method as recited in claim 1, wherein the electronic device comprises at least one of an electronic book reading device, a laptop computer, a tablet computing device, a portable digital assistant, a desktop computer, or a television.

10. An electronic device comprising:
    an electronic paper display;
    a touch sensor;
    one or more processors; and
    memory storing instructions that, when executed by the one or more processors, cause the one or more processors to perform acts comprising:
        receiving a first indication, from the touch sensor, that a first drawing element is being used to draw an image that includes black, gray, and white pixels on the electronic paper display;
        at least partly in response to the receiving the first indication, rendering an original version of the image that includes the black, gray, and white pixels on the electronic paper display;
        receiving a second indication, from the touch sensor, that at least one of the first drawing element or a second drawing element is being used to erase a first portion of the image; and
        at least partly in response to the receiving the second indication:
            performing a non-flashing clear to render a ghosted version of the first portion of the image on the electronic paper display, wherein subsequent to performing the non-flashing clear, the ghosted version of the first portion of the image remains at least partially perceptible and lighter than the original version of the first portion of the image; and
            refraining from altering the ghosted version of the first portion of the image.

11. An electronic device as recited in claim 10, further comprising rendering a black and white version of the image prior to the rendering the original version of the image, wherein the rendering of the black and white version of the image comprises assigning a value of at least some gray pixels, of the black, gray, and white pixels, to one of black or white.

12. An electronic device as recited in claim 11, wherein the assigning comprises:
    determining, for each respective gray pixel of the original version of the image, whether the value of the gray pixel is nearer black or nearer white; and
    assigning the value of the gray pixel to black at least partly in response to determining that the value of the gray pixel is nearer black; or
    assigning the value of the gray pixel to white at least partly in response to determining that the value of the gray pixel is nearer white.

13. An electronic device as recited in claim 11, wherein the assigning comprises:
    determining, for a gray pixel of the original version of the image, whether the value of the gray pixel is less than a threshold value; and
    assigning the value of the gray pixel to white at least partly in response to determining that the value of the gray pixel is less than the threshold value; or
    assigning the value of the gray pixel to black at least partly in response to determining that the value of the gray pixel is equal to or greater than the threshold value.

14. An electronic device as recited in claim 11, wherein the original version of the image is rendered at a first rate that is slower than a second rate at which the black and white version of the image is rendered.

15. An electronic device as recited in claim 11, wherein rendering the black and white version of the image and rendering the original version of the image are performed using one or more display-update modes.

16. An electronic device as recited in claim 11, wherein rendering the black and white version of the image and rendering the original version of the image are performed using one or more waveform modes.

17. An electronic device as recited in claim 10, wherein the rendering the original version of the image comprises using a different waveform mode for altering positions of particles of the electronic paper display than performing the non-flashing clear to render the ghosted version of the image.

18. An electronic device as recited in claim 10, wherein the electronic device comprises at least one of an electronic book reading device, a laptop computer, a tablet computing device, a portable digital assistant, a desktop computer, or a television.

19. One or more non-transitory computer-readable media storing computer-executable instructions that, when executed by one or more processors, cause the one or more processors to perform acts comprising:
- receiving a first indication, from a touch sensor of an electronic device, that a first drawing element is being used to draw an image that includes black, gray, and white pixels on an electronic paper display;
- at least partly in response to the receiving the first indication, rendering an original version of the image that includes the black, gray, and white pixels on the electronic paper display;
- receiving a second indication, from the touch sensor, that at least one of the first drawing element or a second drawing element is being used to erase a first portion of the image; and
- at least partly in response to the receiving the second indication:
  - performing a non-flashing clear to render a ghosted version of the first portion of the image on the electronic paper display, wherein subsequent to performing the non-flashing clear, the ghosted version of the first portion of the image remains at least partially perceptible and lighter than the original version of the first portion of the image; and
  - refraining from altering the ghosted version of the first portion of the image.

20. One or more non-transitory computer-readable media as recited in claim 19, further comprising rendering a black and white version of the image prior to the rendering the original version of the image, wherein the rendering of the black and white version of the image comprises assigning a value of at least some gray pixels, of the black, gray, and white pixels, to one of black or white.

21. One or more non-transitory computer-readable media as recited in claim 20, wherein the assigning comprises:
- determining, for each respective gray pixel of the original version of the image, whether the value of the gray pixel is nearer black or nearer white; and
- assigning the value of the gray pixel to black at least partly in response to determining that the value of the gray pixel is nearer black; or
- assigning the value of the gray pixel to white at least partly in response to determining that the value of the gray pixel is nearer white.

22. One or more non-transitory computer-readable media as recited in claim 20, wherein the assigning comprises:
- determining, for a gray pixel of the original version of the image, whether the value of the gray pixel is less than a threshold value; and
- assigning the value of the gray pixel to white at least partly in response to determining that the value of the gray pixel is less than the threshold value; or
- assigning the value of the gray pixel to black at least partly in response to determining that the value of the gray pixel is equal to or greater than the threshold value.

23. One or more non-transitory computer-readable media as recited in claim 20, wherein the original version of the image is rendered at a first rate that is slower than a second rate at which the black and white version of the image is rendered.

24. One or more non-transitory computer-readable media as recited in claim 20, wherein rendering the black and white version of the image and rendering the original version of the image are performed using one or more display-update modes.

25. One or more non-transitory computer-readable media as recited in claim 20, wherein rendering the black and white version of the image and rendering the original version of the image are performed using one or more waveform modes.

26. One or more non-transitory computer-readable media as recited in claim 19, wherein the rendering the original version of the image comprises using a different waveform mode for altering positions of particles of the electronic paper display than performing the non-flashing clear to render the ghosted version of the image.

27. One or more non-transitory computer-readable media as recited in claim 19, wherein the electronic device comprises at least one of an electronic book reading device, a laptop computer, a tablet computing device, a portable digital assistant, a desktop computer, or a television.

\* \* \* \* \*